(12) United States Patent
Fang et al.

(10) Patent No.: US 12,052,064 B2
(45) Date of Patent: Jul. 30, 2024

(54) MINIMIZATION OF DRIVING TESTS IN DUAL CONNECTIVITY NETWORKS

(71) Applicant: ZTE CORPORATION, Guangdong (CN)

(72) Inventors: Jianmin Fang, Shenzhen (CN); Li Yang, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 324 days.

(21) Appl. No.: 17/376,756

(22) Filed: Jul. 15, 2021

(65) Prior Publication Data

US 2021/0344430 A1 Nov. 4, 2021

Related U.S. Application Data

(63) Continuation of application No. PCT/CN2019/072508, filed on Jan. 21, 2019.

(51) Int. Cl.
*H04B 17/29* (2015.01)
*H04W 24/08* (2009.01)
*H04W 76/16* (2018.01)

(52) U.S. Cl.
CPC .......... *H04B 17/29* (2015.01); *H04W 24/08* (2013.01); *H04W 76/16* (2018.02)

(58) Field of Classification Search
CPC ..... H04W 76/16; H04W 24/08; H04W 24/10; H04B 17/29
See application file for complete search history.

(56) References Cited

U.S. PATENT DOCUMENTS

| 10,334,659 | B2* | 6/2019 | Huang ................ H04W 76/10 |
| 2015/0223212 | A1 | 8/2015 | Der Velde et al. |
| 2018/0332629 | A1 | 11/2018 | Huang et al. |
| 2019/0373626 | A1* | 12/2019 | Vajapeyam ........... H04W 72/21 |

FOREIGN PATENT DOCUMENTS

| CN | 102457890 A | 5/2012 |
| CN | 102761863 A | 10/2012 |
| CN | 102892129 A | 1/2013 |
| CN | 103209424 A | 7/2013 |
| CN | 105764089 A | 7/2016 |

(Continued)

OTHER PUBLICATIONS

International Search Report and Written Opinion for PCT Appl. No. PCT/CN2019/072508, mailed Oct. 11, 2019 (6 pages).

(Continued)

*Primary Examiner* — Ankur Jain
(74) *Attorney, Agent, or Firm* — Foley & Lardner LLP

(57) ABSTRACT

In one aspect a wireless communications method is disclosed. The method includes receiving, at the first base station, an activation message to allow the first base station to receive the network performance information from a user equipment. The method further includes selecting the user equipment from a plurality of user equipment based on allowed network performance information. The method further includes sending, from the first base station to the user equipment, a configuration message including a configuration for the network performance information that includes the allowed network performance information.

13 Claims, 14 Drawing Sheets

(56) References Cited

FOREIGN PATENT DOCUMENTS

| CN | 105940756 A | 9/2016 |
|---|---|---|
| CN | 107006051 A | 8/2017 |
| CN | 108601038 A | 9/2018 |
| EP | 3 846 527 A1 | 12/2021 |
| KR | 1020150055535 A | 5/2015 |
| WO | WO-2016/012053 A1 | 1/2016 |
| WO | WO-2016/160907 A1 | 10/2016 |
| WO | WO-2018/231136 A1 | 12/2018 |

OTHER PUBLICATIONS

Extended European Search Report for EP Appl. No. 19849984.0, dated Jan. 17, 2022 (12 pages).
Ericsson, "Indication flag for UE support of dual connectivity with NR", 3GPP TSG CT4 Meeting #80, C4-175099, Oct. 27, 2017, Kochi, India (25 pages).
Office Action and Search Report on CN App. No. 201980089857.6 dated Oct. 12, 2023 (with machine English translation, 18 pages).

* cited by examiner

MINIMIZATION OF DRIVING TESTS IN DUAL CONNECTIVITY NETWORKS

CROSS-REFERENCE TO RELATED APPLICATION

This application claims the benefit of priority under 35 U.S.C. § 120 as a continuation of PCT Patent Application No. PCT/CN2019/072508, filed on Jan. 21, 2019, the disclosure of which is incorporated herein by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity, connectivity, and reliability. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, apparatuses, and computer readable media related to wireless communication, and in particular to a method and apparatus for reducing the power consumption of user equipment.

In one aspect a wireless communications method is disclosed. The method includes receiving, at the first base station, an activation message to allow the first base station to receive the network performance information from a user equipment. The method further includes selecting the user equipment from a plurality of user equipment based on allowed network performance information. The method further includes sending, from the first base station to the user equipment, a configuration message including a configuration for the network performance information that includes the allowed network performance information.

In another aspect, a wireless communications method is disclosed. The method includes receiving, at a second base station, a request to associate a first base station with the second base station. The method further includes receiving, from the first base station, an activation message to allow the second base station to receive network performance information. The method further includes sending, from the second base station to a user equipment, a configuration message including a configuration for the network performance information.

The details of one or more implementations are set forth in the accompanying attachments, the drawings, and the description below. Other features will be apparent from the description and drawings, and from the claims.

DETAILED DESCRIPTION

Section headings are used in the present document only to improve readability and do not limit scope of the disclosed embodiments and techniques in each section to only that section.

The disclosed subject matter relates to a mobile communication system, and more particularly to a minimization of drive tests (MDT) configuration method for user equipment connected to multiple base stations.

Figure 1A:
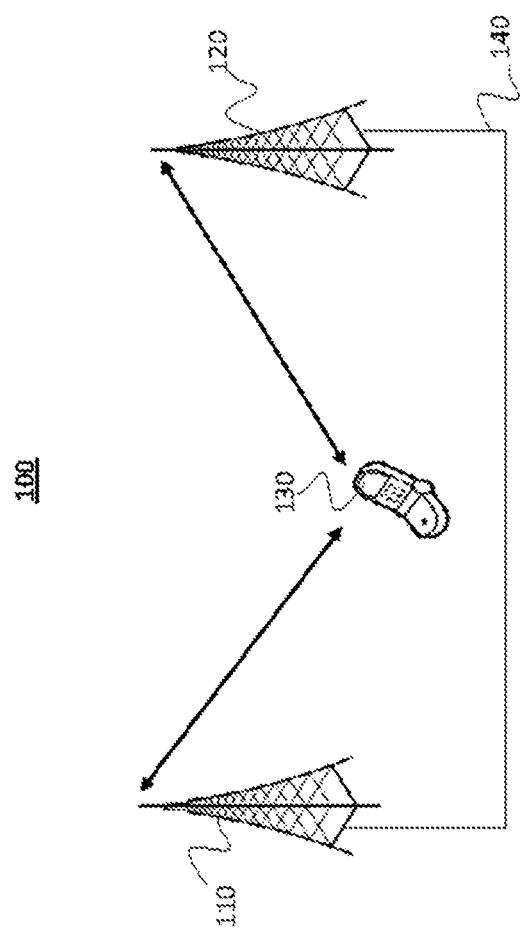
FIG. 1A depicts an example of a system, in accordance with some example embodiments.

FIG. 1A depicts a system 100, in accordance with some example embodiments. System 100 includes a user equipment (UE) 130, a first base station 110 and a second base station 120. The first base station 110 may be in a primary cell and the second base station 120 may be in a secondary cell. Each base station may be a next generation node B (gNB), enhanced Node B (eNB) or other base station. In some example embodiments, UE 130 may provide network performance information such as minimization of drive tests (MDT) information to both base stations 110 and 120.

Figure 1B:
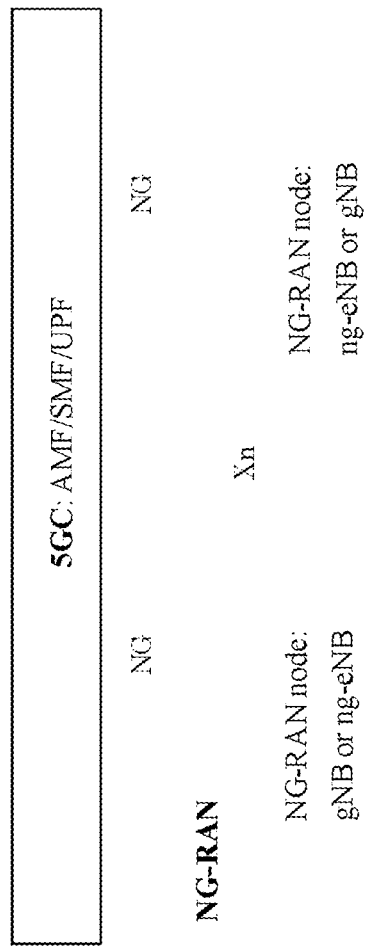
FIG. 1B depicts an example of a 5G network architecture, in accordance with some example embodiments.

FIG. 1B depicts an example of a fifth generation (5G) mobile communication system includes a 5G core network (5GC) and a next generation radio access network (NG-RAN). The 5GC includes a network node such as an access mobility function (AMF), a session management function (SMF), and a user plane function (UPF). The NG-RAN includes at least two different types of base stations and radio access technologies (RATs): ng-eNBs based on 4G base station (eNBs) continue to evolve (the air interface is still 4G RAT, i.e., evolved universal terrestrial radio access (E-UTRA), and 5G base stations (gNB) based on the 5G RAT or NR (New Radio). The NG-RAN base station (gNB or ng-eNB) is connected to the 5GC through the NG interface including the NG-C control plane connection for signaling transmission and the NG-U user plane connection for data transmission, and the NG-RAN base station is connected via the Xn interface including Xn-C control plane connection and Xn-U user plane connection.

Figure 2:
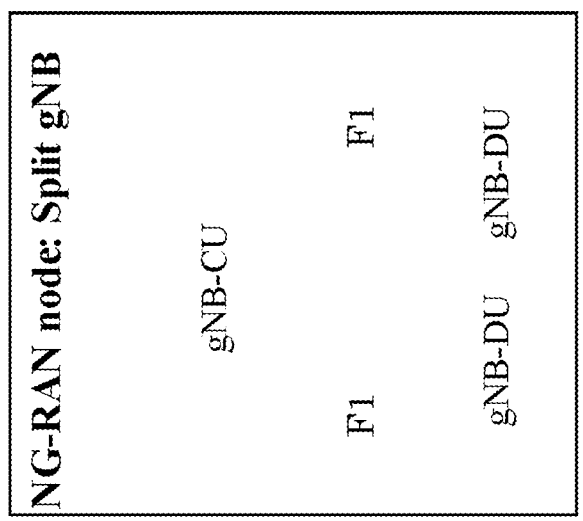
FIG. 2 depicts an example of a base station structure with central unit/decentralized unit (CU/DU) separation, in accordance with some example embodiments.

FIG. 2 depicts an example of a gNB is separated into network node entities including a gNB central unit (gNB-CU) and a plurality of gNB distributed units (gNB-DU), which are connected by an F1 interface, and include an F1-C control plane connection and an F1-U user plane connection. The external interface of the gNB after the CU/DU separation is the NG and Xn interfaces.

Figure 3:
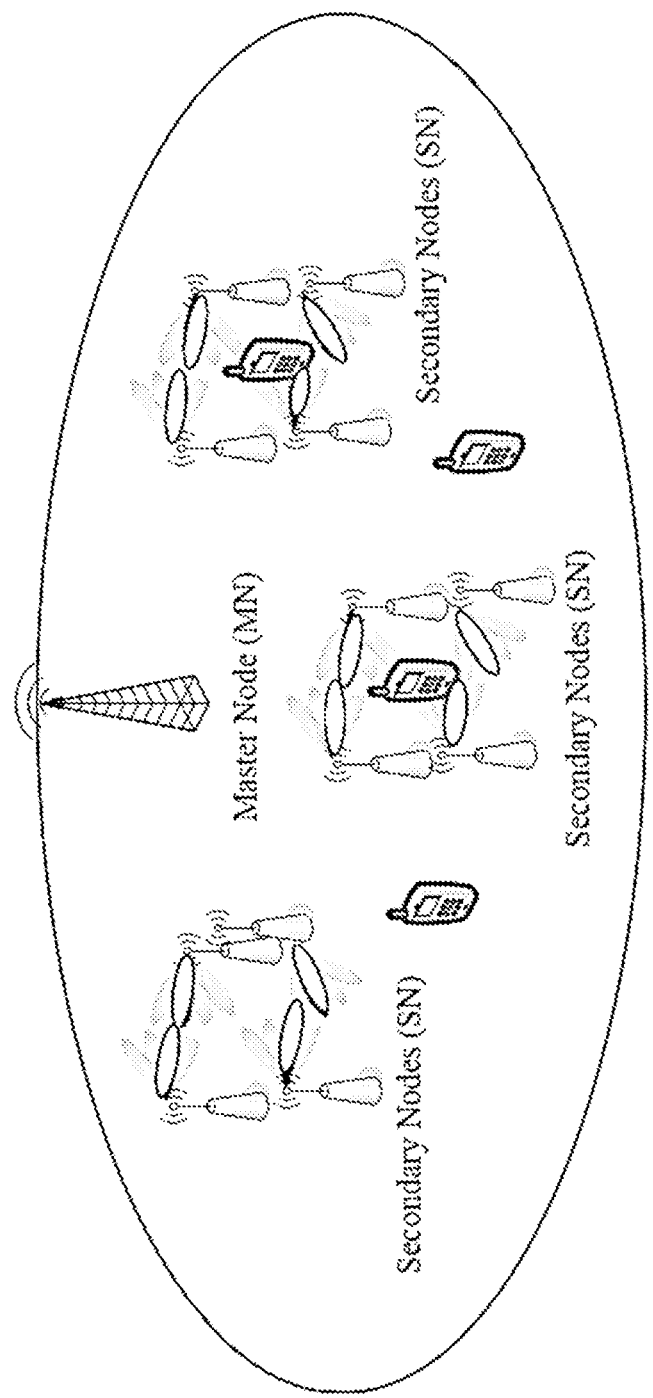
FIG. 3 depicts an example of heterogeneous networks deployed in macro and micro zones using different radio access technologies (RATs), in accordance with some example embodiments.

As shown in FIG. 3, in a heterogeneous network in which a macro and a micro cell are deployed in a hybrid manner, there may be various types of base stations with different RATs, different frequency bandwidths, and different radio coverage capabilities, such as legacy eNB, gNB, ng-eNB, and the like. The master node (MN) is typically used to provide wireless coverage, while the secondary node (SN) is typically used to provide capacity enhancement. The different types of base stations and the terminal UEs are connected through the Uu air interface and include the air interface control plane connection bearer signaling radio bearer (SRB) for transmitting air interface control signaling and the air interface user plane connection data radio bearer (DRB). Transport air interface user service data packets.

To reduce the cost and complexity of manual network testing by mobile network operators using dedicated equipment and personnel, the 4G system since the Rel-10 version has introduced a series of minimized road tests or minimization of driving tests (MDT). The MDT technology uses common terminal UE(s) to measure and collect various network performance indicators related to the UE under the configuration guidance of the network. Then, the UE reports to the base station (e.g., eNB) through air interface signaling. The base station further reports to the trace collection entity (TCE). The TCE is usually located in the mobility management entity (MME) of the 4G core network but may be deployed independently of the 5G core network. The MDT logs reported from the UEs can be used in judging the performance of the network's deployment and to guide any adjustment and optimization of various functional parameters at the network. For example, it can detect weak coverage and blind spots in some areas of the network and can find hotspot areas with large-capacity communication requirements and certain user service subscription quality of service (QoS) cannot be satisfied.

The MDT can be classified into management-based MDT and signaling based MDT according to the configuration of the MDT related parameters on the network. The activation process of the management-based MDT may include the operation, administration and management (OAM) directly sending a trace session activation including the MDT parameter configuration to the base station (e.g., eNB), and the base station selects appropriate target UE(s) within the scope specified by the message. The MDT parameter configuration information is sent to the selected UE(s). The activation process of the signaling-based MDT is that the OAM first sends a trace session activation message containing the MDT parameter configuration to the home subscriber server (HSS) to activate the MDT measurement of the target UE. The MDT parameter configuration information of the UE is sent to the core network, and the core network sends the MDT parameter configuration information of the UE to the eNB, and the eNB finally sends the MDT parameter configuration information to the target UE to perform the MDT.

Figure 4:
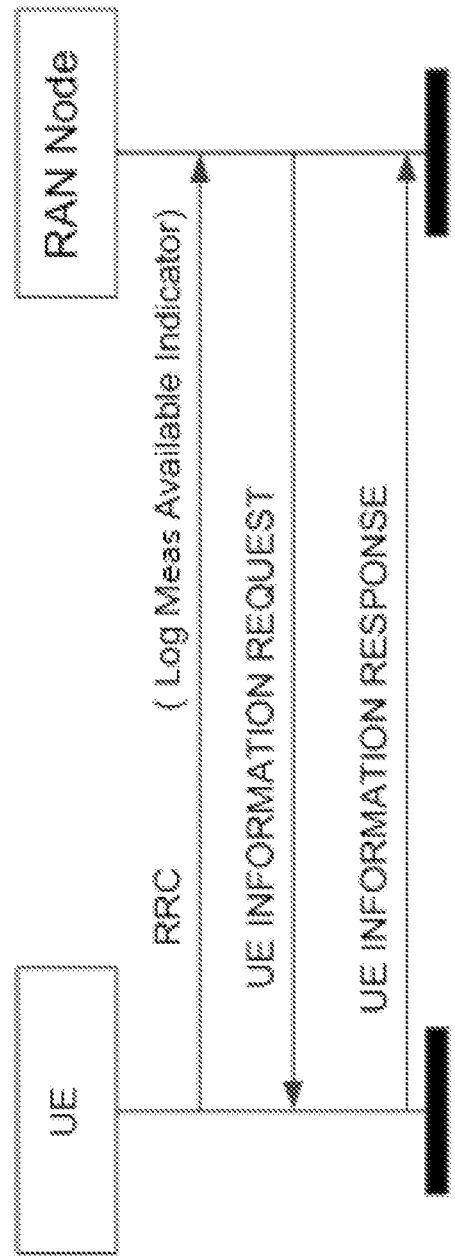
FIGS. 4-12 depict examples of processes, in accordance with some example embodiments.

The MDT can be classified into a recording MDT which may be referred to as a logged MDT corresponding to the UE in the idle state RRC_IDLE or inactive state RRC_INACTIVE and an immediate MDT corresponding connection state RRC_CONNECTED according to the RRC state of the MDT task performed by the UE. Logged MDT refers to the execution of logged MDT measurement tasks by the UE in the RRC_IDLE or RRC_INACTIVE state according to the MDT related parameter configuration such as the valid range of logged MDT, recording interval and recording duration received in the connected state. Record the measurement results as an MDT log. When the UE returns to the RRC_CONNECTED state, the base station sends an indication message "available measurement record" to the base station through a suitable RRC uplink message such as RRCConnectionSetupComplete. If necessary, the base station acquires the drive test log information stored by the UE from the UE at an appropriate time. As shown in FIG. 4, the base station sends a UE INFORMATION REQUEST message to the UE, requesting the terminal to report the stored MDT way log information, and then the terminal reports all the pieces through one or more UE INFORMATION RESPONSE messages depending on the size of the MDT log, or part of the MDT road test log information. After receiving the MDT test log information, the base station forwards the information to the TCE for analysis and processing. The immediate MDT refers to the measurement immediately after the UE receives the MDT related parameter configuration in the connected state, that is, the measurement is also performed in the connected state, and immediately reports the measurement result and the UE may not store the measurement result.

According to the different protocol layer attributes of the measured quantity, the MDT can be roughly classified into three types: L1 measurement: for example, the strength of the LTE downlink pilot signal or common reference signal (CRS), reference signal receiving power (RSRP), and measurement of reference signal receiving quality (RSRQ); L2 measurement: for example, LTE medium access control/radio link control (MAC/RLC)/measurement of delay/drop rate of protocol layer packets such as packet data convergence protocol (PDCP); L3 measurement: for example, measurement of indicators such as the average number of radio resource control (RRC) connections of a cell.

The measurements of the immediate MDT associated with the UE mainly include the downlink pilot strength (RSRP and RSRQ), the UE's transmit power headroom, and the uplink PDCP packet delay. The logged MDT related measurement configured for the UE mainly includes the downlink pilot strength (RSRP and RSRQ).

Currently, for a RAT, the UE only saves a set of logged MDT configurations. When the network provides a new configuration, the old configuration will be completely replaced, and the old configuration-related measurement results will be cleared. The measurement report is self-contained, that is, the base station can parse the measurement result reported by the logged MDT even if the relevant configuration information is not known. Each measurement report also contains the parameters needed to route the measurement report to the correct TCE.

Dual connectivity (DC) is supported in both 4G and 5G systems. The dual-connected UE can maintain connectivity with two base stations at the same time. One of the base stations is called a primary base station (MN), and the other base station is called a secondary base station (SN). There are multiple dual connections of 4G and 5G RAT hybrid networks, such as E-UTRA-NR dual connectivity (EN-DC). The primary base station is the eNB, the secondary base station is the gNB and the NG-RAN E-UTRA-NR dual connectivity (NGEN-DC). In this case, the primary base station is ng-eNB, the secondary base station is gNB, and the NR-E-UTRA dual connectivity (NE-DC). The primary base station is the gNB and the secondary base station is the ng-eNB. The 5G RAT dual-connect NR-DC the primary base station and the secondary base station are both gNBs.

The disclosed subject matter includes the multiple (e.g., dual) connection related MDT function, and how to implement the multiple (e.g., dual) connection related MDT function, but not limited to multiple (e.g., dual) connection scenarios. Some solutions are also for single connection scenarios. Some solutions are related to both single connection and multiple (e.g., dual) connection scenarios.

The base station receives the following from the core network through an interface message such as INITIAL CONTEXT SETUP REQUEST, TRACE START or a new message such as MDT START, or receives at least the following from other related entities through an interface message between the base station and the other related entities: UE allowed MDT information, UE MDT PLMN list information, beam configuration information, frequency configuration information, A2 Threshold information.

The UE allowed MDT information to include at least one of: allowing MDT to be performed at the 4G RAT, allowing only MDT at the 4G RAT, allowing MDT at the 5G RAT, allowing only MDT at the 5G RAT, allowing MDT at all RATs, allowing MDT to be performed at the MN, MDT is only allowed to be performed at the MN, MDT is allowed to be performed at the SN, MDT is allowed only at the SN, MDT is allowed to be performed at the MN and the SN, the total number of allowed MDT configurations, the number of allowed MDT configurations in same RAT, SN is allowed to configure log MDT in case of LTE-DC, SN is allowed to configure log MDT in case of EN-DC, SN is allowed to configure log MDT in case of NGEN-DC, SN is allowed to configure log MDT in case of NE-DC, SN is allowed to configure log MDT in case of NR-DC.

The UE MDT PLMN list information includes at least one of: a management-based 4G RAT MDT PLMN list, a signaling-based 4G RAT MDT PLMN list, a management-based 5G RAT MDT PLMN list, a signaling-based 5G RAT MDT PLMN list.

The beam configuration information includes at least one of the following: a number of reported beams, a number of reported MN beams, a number of reported SN beams, a report threshold.

The frequency configuration information includes at least one of the following: MDT frequency list, additional frequency list, logged MDT only frequency list.

The A2 Threshold information comprises at least one of the following: The A2 Threshold for SSB, A2 Threshold for CSI-RS, A2 Threshold for FR1, A2 Threshold for FR2, A2 Threshold for SINR, A2 Threshold, A2 Indication to indicate whether the A2 Threshold is for SSB or CSI-RS or FR1 or FR2 or SINR.

The UE allowed MDT information and/or the UE MDT PLMN list information and/or the beam configuration information and/or the frequency configuration information and/or A2 Threshold information is transferred between the base stations through the inter-base station direct interface messages such as HANDOVER REQUEST, RETRIEVE UE CONTEXT RESPONSE messages or through the indirect interface messages between base station and core network such as HANDOVER REQUIRED and HANDOVER REQUEST messages.

The UE allowed MDT information and/or the UE MDT PLMN list information and/or the beam configuration information and/or the frequency configuration information and/or A2 Threshold information is sent via a direct interface message between the MN and the SN, such as the SGNB ADDITION REQUEST, the S-NODE ADDITION REQUEST message by the MN to the SN.

The base station selects the UE(s) to perform MDT according to the UE allowed MDT information of the UE(s) and selects only the UE(s) allowed by the UE allowed MDT information.

The UE MDT PLMN list is configured by the base station to the UE, and the UE performs MDT only in the PLMN(s) listed in the UE MDT PLMN list and the PLMN receiving the MDT configuration.

The beam configuration information is configured by the base station to the UE. When the UE reports the MDT measurement result to the base station, it reports one of the following for each relevant cell: the identifier of at most N best beams and the measurement result of the N best beams, up to N best beams above the report threshold, all the beams above the report threshold, N is the number of reported beams defined in the beam configuration information.

The frequency configuration information is sent from the base station to the UE, then the UE takes at least one of the following actions: to log the measurement results for the frequencies belonging to the MDT frequency list; to log the measurement results for the frequencies belonging to the additional frequency list besides the frequencies broadcast in system information; to log the measurement results for the frequencies belonging to the logged MDT only frequency list broadcast in system information, and the frequencies belonging to the logged MDT only frequency list are not allowed to be used for cell re-selection purpose.

The logged MDT only frequency list broadcast in the system information can also be implicitly expressed by giving an indication to each of the frequencies broadcast in the system information to indicate whether it is a logged MDT only frequency.

The A2 Threshold information is sent from the base station to the UE, then the UE takes at least one of the following actions: perform immediate MDT and report the measurement results for SSB when the A2 event is triggered according to the A2 threshold for SSB; perform immediate MDT and report the measurement results for CSI-RS when the A2 event is triggered according to the A2 threshold for CSI-RS; perform immediate MDT and report the measurement results for SSB and/or CSI-RS when the A2 event is triggered according to the A2 Threshold for FR1; perform immediate MDT and report the measurement results for SSB and/or CSI-RS when the A2 event is triggered according to the A2 threshold for FR2; perform immediate MDT and report the measurement results for SSB and/or CSI-RS when the A2 event is triggered according to the A2 threshold for SINR.

Inter-RAT MDT Log Report Example

When the UE is configured with a logged MDT measurement configuration in a 4G RAT LTE cell and when the UE is released to an idle/inactive state and performs inter-RAT cell reselection to a 5G RAT NR cell, then the UE can deliver the "logMeasAvailable" indication to 5G RAT NR cell. In some example embodiments, the UE can indicate that this is a 4G RAT LTE log report. In some example embodiments, the 5G RAT network can request the 4G RAT LTE log report by including an explicit indicator (e.g. LTE-logRequest) in UEInformationRequest. When the UE is configured with a logged MDT measurement configuration in a 5G RAT NR cell, and when the UE is released to the idle/inactive state and performs inter-RAT cell reselection to 4G RAT LTE cell, then the UE can deliver the "logMeasAvailable" indication to 4G RAT LTE cell. In some example embodiments, the UE can indicate that this is a 5G RAT NR log report. In some example embodiments, the 4G RAT network can request the 5G RAT NR log report by including an explicit indicator (e.g. NR-logRequest) in UEInformationRequest.

MDT Log Report to SN Example

Case1: a UE has been saving a NR log, delivers the NR log report to the SN when the UE is configured with EN-DC or NGEN-DC.

Case2: a UE has been saving an LTE log, delivers the LTE log report to SN when UE is configured with NE-DC.

The following two aspects apply to the foregoing cases 1 and 2.

Aspect 1: Determine whether the UE can send a log report to SN.

Example 1.1: MN sends the PLMN IDs of SN to the UE, the UE decides whether one of the PLMN IDs is included in the PLMN list of log report areas. If yes, then the UE can deliver "logMeasAvailable" indication to the SN.

Example 1.2: UE assumes that the SN uses the same RPLMN as in the MN node. If the RPLMN is included in the PLMN list of log report areas, the UE can deliver "logMeasAvailable" indication to SN side.

Example 1.3: UE directly sends the "logMeasAvailable" indication to the SN, and together with additional information (e.g. PLMN list of log report areas stored at the UE, or TCE-Id . . . ), SN can determine whether it is capable of handling the log report based on those received information. If yes, the SN can further send log request to UE.

Aspect 2: Acquire log report.

Example 2.1: UE sends a "logMeasAvailable" indication to the SN by using a SN RRC message via SRB3 directly. The SN decides whether to acquire the log report, and how to acquire the log report (through SRB3 message or embedded SN RRC message via SRB1).

Example 2.2: UE sends a "logMeasAvailable" indication to the SN by using an embedded MN RRC message via SRB1. The SN decides whether to acquire the log report, and how to acquire the log report (through SRB3 message or embedded SN RRC message via SRB1).

Example 2.3: UE sends a "logMeasAvailable" indication to the MN by using a MN RRC message. The MN forwards the indication to the SN. The SN decides whether to acquire the log report, and how to acquire the log report (through SRB3 message or embedded SN RRC message via SRB1).

Example 2.4: UE sends a "logMeasAvailable" indication to the MN by using an MN RRC message. The MN acquires the log report and delivers the log report to SN.

Logged MDT Configuration at Both MN and SN Example

Aspect 1: Signaling procedure at the network.

Example 1.1: The core network sends two sets of MDT configurations to the MN, one set is for the MN, the other set is for the SN. The MN forwards the one for SN to the SN;

Example 1.2: The core network sends only one set of a MDT configuration to the MN, and the MN forwards it to the SN;

Example 1.3: The core network sends only one set of MDT configuration to the MN, and indicates it is for MN or SN. If indicated that it is for the SN, then the MN forwards it to the SN;

Example 1.4: The core network sends only one set of MDT configuration to the MN, the MN can further decide whether it is for the MN or the SN. If it is for the SN, then the MN forwards it to the SN.

Aspect 2: UE Behavior.

If the UE is configured with two sets of MDT configuration, then the UE saves two sets of MDT configuration, performs two individual MDT tasks and saves two sets of MDT measurement results for the MN and the SN. If the UE is configured with only one set of configuration, then the UE saves only one set of configuration, performs only one MDT task and saves only one set of MDT measurement result for the MN or the SN; the new set of MDT configuration will replace the old one, no matter where the new one is from, MN or SN, and no matter where the old one is from, MN or SN.

Using the disclosed subject matter to implement multiple connection (e.g., dual) MDT, the MDT can be better utilized, and the rights of the end user can be fully guaranteed.

Example 1

Figure 5:
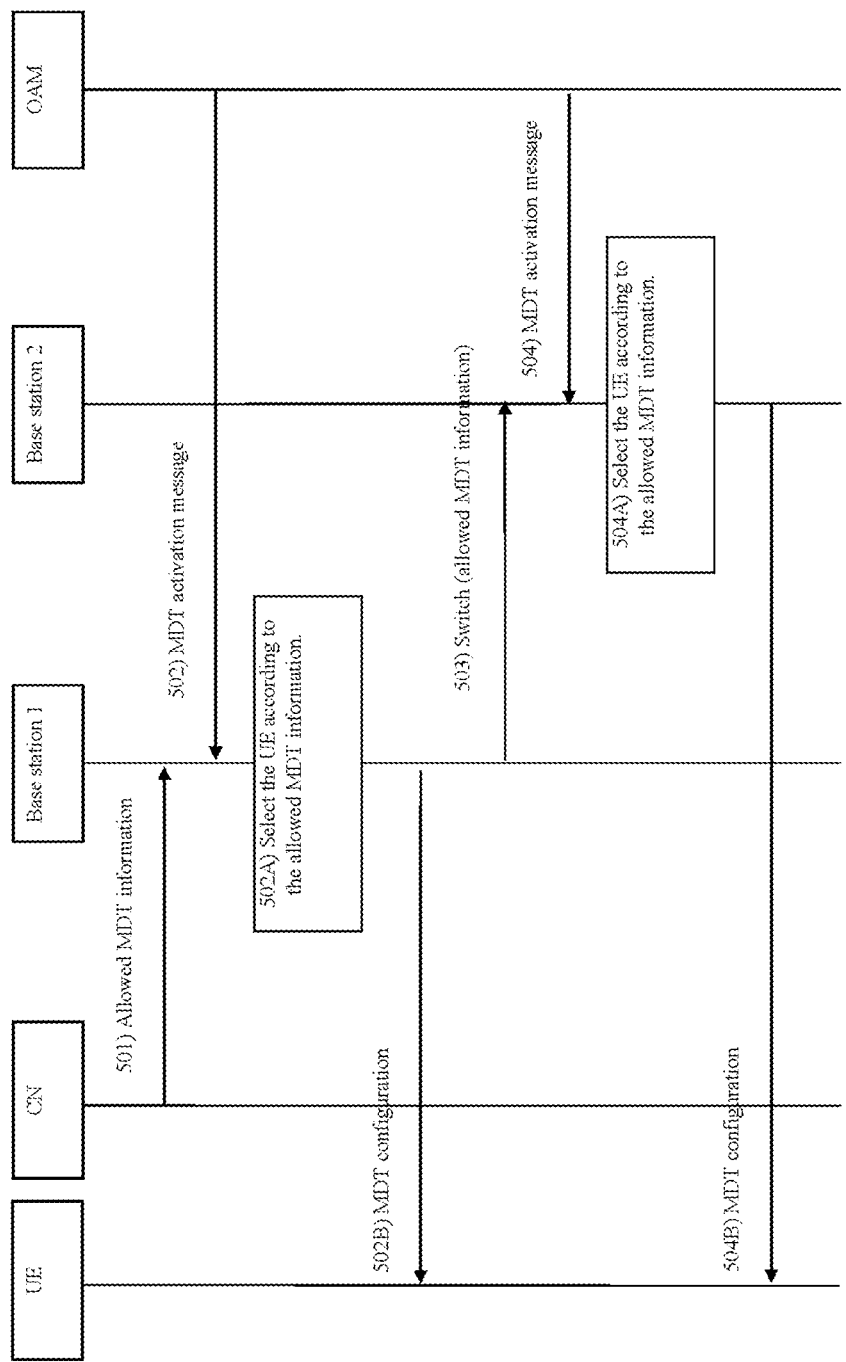

FIG. 5 depicts a process, in accordance with some example embodiments. At 501, the core network sends to base station 1 the UE allowed MDT information, the UE MDT PLMN list information via a message such as the INITIAL CONTEXT SETUP REQUEST, for the UE being accessed, or the core network configures for the UE that has completed the connection. The UE allowed MDT information, the UE MDT PLMN list information is transmitted to the base station 1 through a message of the relevant core network to the base station, such as a TRACE START message, or an MDT START message. The UE allowed MDT information to include at least one of: allowing MDT at 4G RAT, allowing MDT at 5G RAT, allowing MDT at all RATs, allowing MDT at MN, allowing MDT at SN, allowing at MN and SN Perform MDT. The UE MDT PLMN list information includes at least one of: a management-based 4G RAT MDT PLMN list, a signaling-based 4G RAT MDT PLMN list, a management-based 5G RAT MDT PLMN list, a signaling-based 5G RAT MDT PLMN list.

At 502, the base station 1 receives the MDT activation message from the OAM. When selecting the UE(s) for MDT, only the UE(s) allowed by the allowed MDT information is selected, and the UE MDT PLMN list is configured to the UE.

At 503, the UE switches from base station 1 to base station 2. When the handover is performed through the direct interface between the base stations, the UE allowed MDT information and the MDT PLMN list of the UE is carried in the HANDOVER REQUEST message from the base station 1 to the base station 2; when switching through the core network, the UE allowed MDT information, the UE MDT PLMN list are carried in the HANDOVER REQUIRED message from the base station 1 to the core network, and forwarded by the core network to the base station 2 in the HANDOVER REQUEST message.

At 504, base station 2 receives the MDT activation message from the operation, administration and management (OAM). When selecting the UE(s) for MDT, only the UE(s) allowed by the UE allowed MDT information are selected, and the UE MDT PLMN list is configured to the UE.

Example 2

Figure 6:
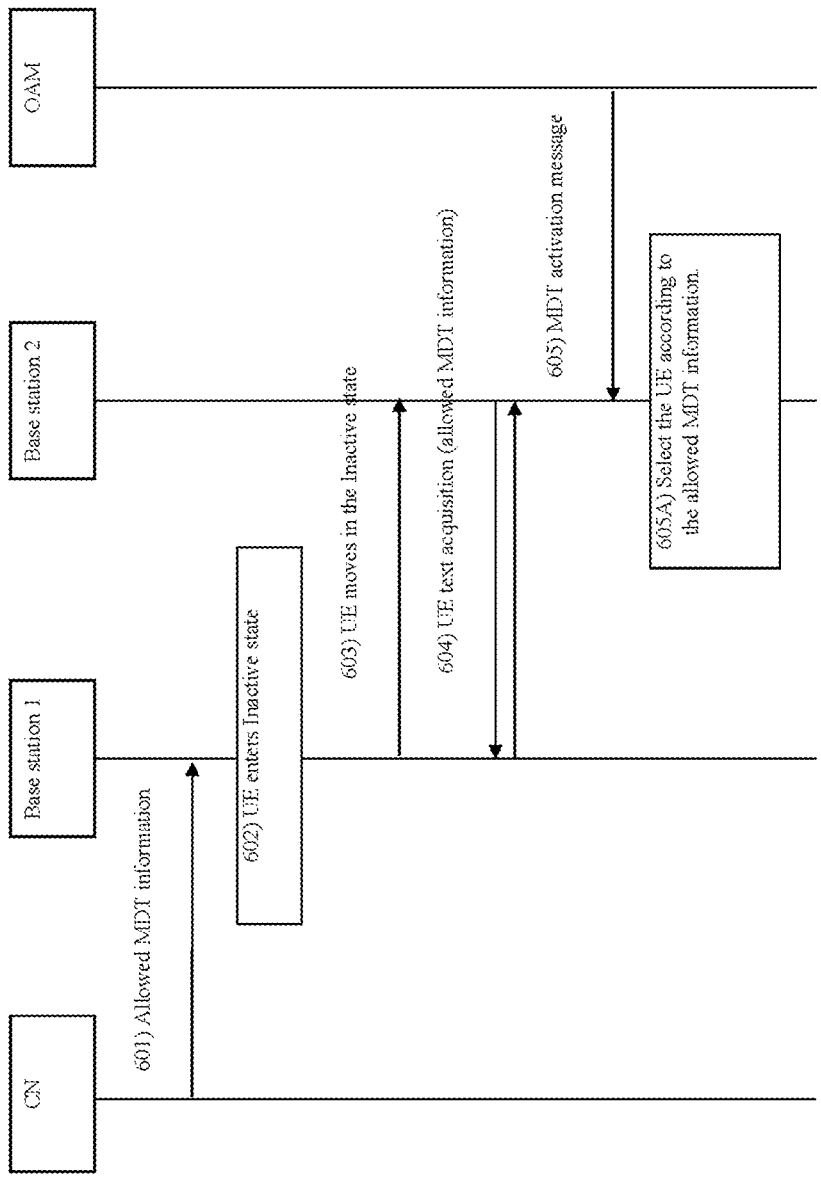

FIG. 6 depicts another process, in accordance with some example embodiments. At 601, the core network sends the UE allowed MDT information to base station 1 via a related message from the core network to the base station such as the INITIAL CONTEXT SETUP REQUEST, or the core network, for the UE that has completed the connection, via a message, such as the TRACE START message, or the MDT START message, sends the UE allowed MDT information to the base station 1. The UE allowed MDT information to include at least one of: allowing MDT at 4G RAT, allowing MDT at 5G RAT, allowing MDT at all RATs, allowing MDT at MN, allowing MDT at SN, allowing at MN and SN Perform MDT.

At 602, the UE enters an inactive state.

At 603, the UE is handed off to the base station 2 in the inactive state.

At 604, base station 2 acquires the UE text information from the base station 1, and acquires the UE allowed MDT information from the RETRIEVE UE CONTEXT RESPONSE message.

At 605, base station 2 receives the MDT activation message from the OAM and selects only the UE(s) allowed by the UE allowed MDT information when the UE performs the MDT.

Example 3

Figure 7:
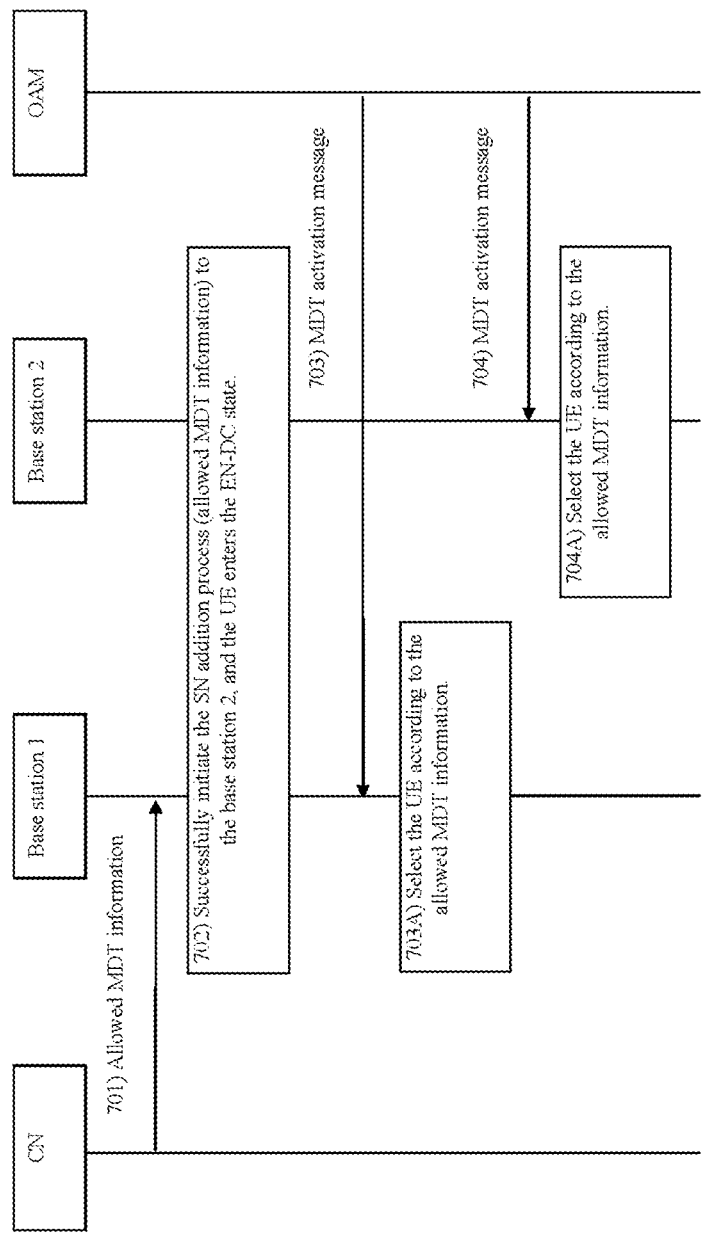

FIG. 7 depicts another process, in accordance with some example embodiments. At 701, the core network sends the UE allowed MDT information for the UE being accessed to the base station 1 via a message such as the INITIAL CONTEXT SETUP REQUEST, or the core network passes for the UE that has completed the connection, via a message, such as the TRACE START message, or the MDT START message, the UE allowed MDT information to the base station 1. The UE allowed MDT information to include at least one of: allowing MDT at 4G RAT, allowing MDT at 5G RAT, allowing MDT only at 4G RAT, allowing MDT only at 5G RAT, allowing MDT at all RATs, allowing MDT at MN, allowing MDT at SN, allowing MDT only at MN, allowing MDT only at SN, allowing at MN and SN Perform MDT.

At 702, for the UE, base station 1 initiates the SN addition process to base station 2 and carries the UE allowed MDT information of the UE in the SN addition request message such as SGNB ADDITION REQUEST from base station 1 to base station 2, and the UE enters the EN-DC state, and the base station 1 is the UE's master base station, the base station 2 is UE's secondary base station. Base station 1 is an eNB, and base station 2 is a gNB. The secondary base station obtains the UE allowed MDT information from the SN addition request message.

At 703, base station 1 receives the MDT activation message from the OAM, and selects only the UE(s) allowed by the UE allowed MDT information when the UE performs the MDT. For example, when the UE allowed MDT information to be "allowing MDT at 4G RAT", the UE may be selected to perform MDT because the base station 1 is a 4G RAT base station; for example, when the UE allowed MDT information to be "allowing MDT only at SN", the UE may not be selected for the MDT because the base station 1 is the MN; for example, when the UE allowed MDT information to be "allowing MDT at 4G RAT" and "allowing MDT at SN" the UE may be selected for MDT since base station 1 is a 4G RAT base station.

At 704, base station 2 receives the MDT activation message from the OAM and selects only the UE(s) allowed by the UE allowed MDT information when the UE performs the MDT. For example, when the UE allowed MDT information to be "allowing MDT at 4G RAT", the UE may not be selected for MDT because base station 2 is a 5G RAT base station; for example, when the UE allowed MDT information to be "allowing MDT at SN", the UE may be selected to perform MDT because the base station 2 is the SN; for example, when the UE allowed MDT information to be "allowing MDT at 4G RAT" and "allowing MDT at SN", the UE may be selected for MDT because base station 2 is an SN.

Example 4

Figure 8:
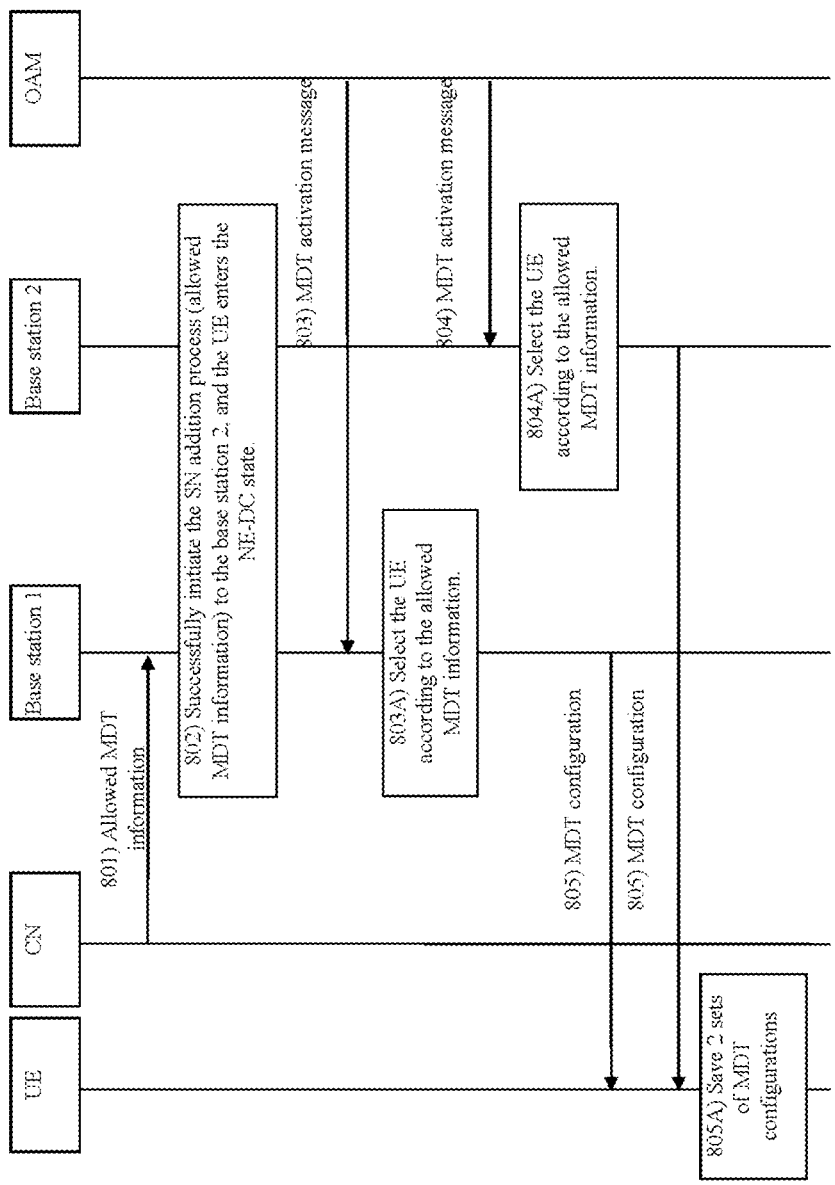

FIG. 8 depicts another process, in accordance with some example embodiments. At 801, the core network sends the UE allowed MDT information to base station 1 through the related message from the core network to the base station, such as the INITIAL CONTEXT SETUP REQUEST, for the UE being accessed, or the core network passes for the UE that has completed the connection, the message, such as the TRACE START message, or the MDT START message, carrying the UE allowed MDT information to the base station 1. The UE allowed MDT information to include at least one of: allowing MDT at 4G RAT, allowing MDT at 5G RAT, allowing MDT at all RATs, allowing MDT at MN, allowing MDT at SN, allowing MDT at MN and SN, the total number of allowed MDT configurations, the number of MDT configurations allowed with the same RAT.

At 802, for the UE, base station 1 initiates an SN addition process with base station 2, and carries the UE allowed MDT information of the UE in the SN addition request message (such as S-NODE ADDITION REQUEST) from base station 1 to the base station 2, and the UE enters the NE-DC state, and the primary base station of the UE is base station 1 and the secondary base station is base station 2, and the base station 2 acquires the UE allowed MDT information of the UE from the SN addition request message. Base station 1 is a gNB and base station 2 is a ng-eNB.

At 803, base station 1 receives the MDT activation message from the OAM and selects only the UE(s) allowed by the UE allowed MDT information when the UE performs the MDT. For example, the UE allowed MDT information to be "allowing MDT at all RATs" and "allowing MDT at MN and SN" and "the total number of allowed MDT configurations=2" and "the number of MDT configurations allowed with the same RAT=1", then may select the UE(s) to perform MDT and does not need to negotiate with the SN because the MN and SN are different RATs, one individual set is allowed to be configured separately.

At 804, base station 2 receives the MDT activation message from the OAM and selects only the UE(s) allowed by the UE allowed MDT information when the UE performs the MDT. For example, the UE allowed MDT information to be "allowing MDT at all RATs" and "allowing MDT at MN and SN" and "the total number of allowed MDT configurations=2" and "the number of MDT configurations allowed with the same RAT=1", then may select the UE(s) to perform MDT and does not need to negotiate with the MN since the MN and the SN are different RATs, each of which allows to configure one individual set.

At 805, the UE receives one set of MDT configuration from base station 1 and another set from base station 2, respectively performs measurements according to the two sets of MDT configurations, and separately stores the measurement results corresponding to the two sets of MDT configurations.

Example 5

Figure 9:
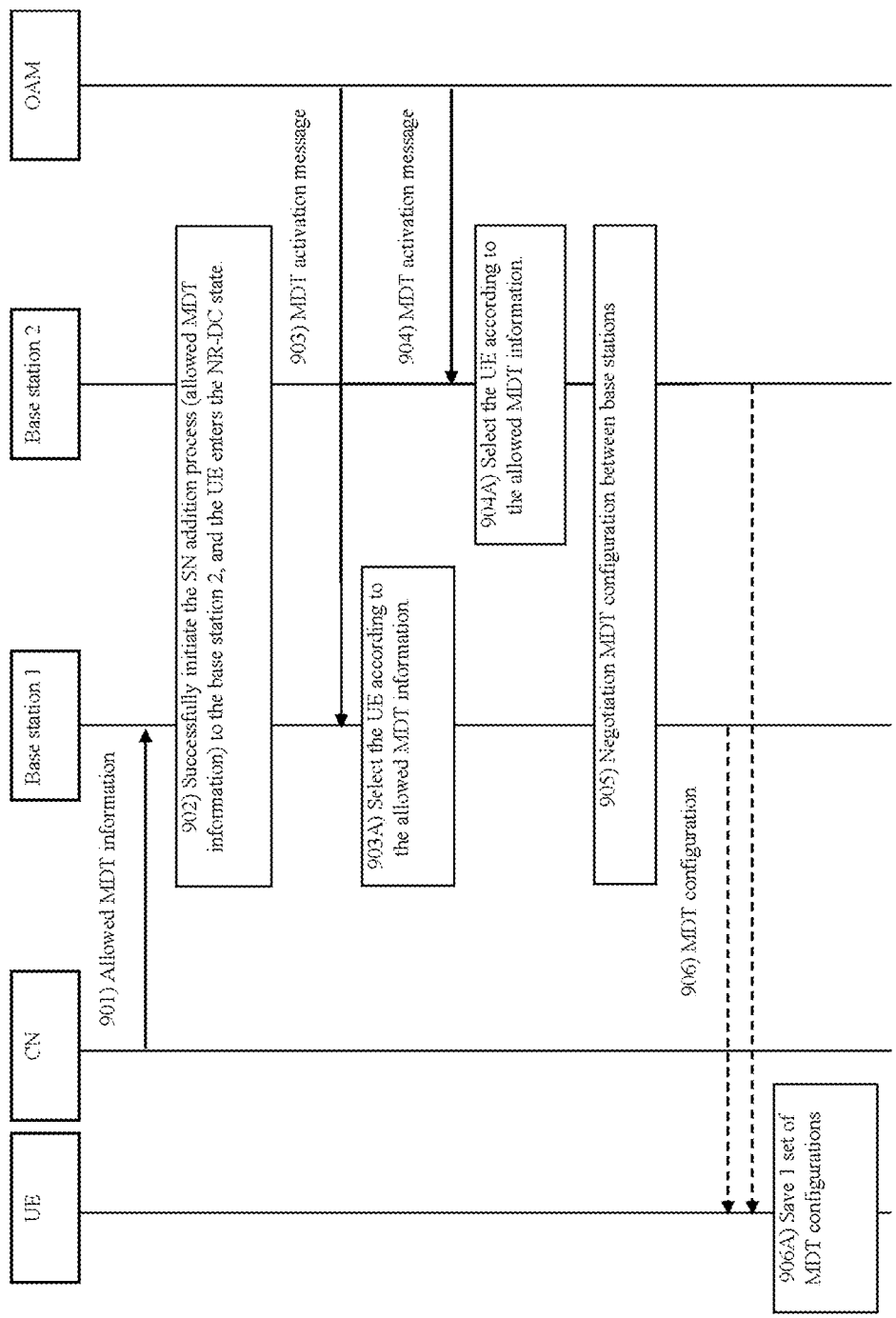

FIG. 9 depicts another process, in accordance with some example embodiments. At 901, the core network sends the UE allowed MDT information to base station 1 through a message such as the INITIAL CONTEXT SETUP REQUEST, for the UE being accessed, or the core network passes the relevant message from core network to the base station 1 for the UE that has completed the connection, such as the TRACE START message or the MDT START message, carrying the UE allowed MDT information. The UE allowed MDT information to include at least one of: allowing MDT at 4G RAT, allowing MDT at 5G RAT, allowing MDT at all RATs, allowing MDT at MN, allowing MDT at SN, allowing MDT at MN and SN, the total number of allowed MDT configurations, and the number of MDT configurations allowed with the same RAT.

At 902, for the UE, base station 1 initiates the SN addition process with base station 2 and carries the UE allowed MDT information of the UE in the SN addition request message such as the S-NODE ADDITION REQUEST from base station 1 to base station 2, and the UE enters the NR-DC state. Base station 1 is a gNB and base station 2 is a gNB. The primary base station is base station 1, and the secondary base station is the base station 2. Base station 2 obtains the UE allowed MDT information from the SN addition request message.

At 903, base station 1 receives the MDT activation message from the OAM and selects only the UE(s) allowed by the UE allowed MDT information when selecting the UE(s) to perform the MDT. For example, the UE allowed MDT information to be "allowing MDT at all RATs" and "allowing MDT at MN and SN" and "the total number of allowed MDT configurations=2" and "the number of MDT configurations allowed with the same RAT=1", then may select the UE(s) to perform the MDT, but needs to negotiate with the SN since the MN and the SN are the same RAT, and the same RAT is only allowed to configure one set.

At 904, base station 2 receives the MDT activation message from the OAM and selects only the UE(s) allowed by the UE allowed MDT information when selecting the UE(s) to perform the MDT. For example, the UE allowed MDT information to be "allowing MDT at all RATs" and "allowing MDT at MN and SN" and "the total number of allowed MDT configurations=2" and "the number of MDT configurations allowed with the same RAT=1", then may select the UE(s) to perform the MDT, but needs to negotiate with the MN since the MN and the SN are the same RAT, and the same RAT is only allowed to configure one set.

At 905, base station 1 and the base station 2 negotiate to ensure that only one set of MDT configurations is delivered to the UE. The specific negotiation method may be one of the following:

(1) First selection priority: The base station (MN or SN) that first receives the MDT activation message selects the UE and notifies the selected UE to the dual-connected another base station (SN or MN). The other base station will not select the UE when receiving the MDT activation message. When the base station that selects the UE first receives the subsequent MDT activation message, it can continue to select the UE and overwrite the old configuration with the new configuration.

(2) MN priority: When the MN receives the MDT activation message, it selects the UE and notifies the selected UE to the SN. When the SN receives the MDT activation message, it does not select the UE if it knows that the MN has selected the UE, otherwise the UE may be selected by the SN.

The MN selects the UE when it receives the subsequent MDT activation message and overwrites the old configuration with the new configuration no matter whether the old configuration is issued by the MN or the SN.

(3) SN priority: The SN selects the UE when receiving the MDT activation message and notifies the selected UE to the MN. When the MN receives the MDT activation message, it does not select the UE if it knows that the SN has selected the UE, otherwise the UE may be selected by the MN. When the SN subsequently receives the MDT activation message, the UE is selected by the SN, and the new configuration overwrites the old configuration no matter whether the old configuration is issued by the MN or the SN.

(4) MN control: The MN may select the UE when receiving the MDT activation message. When receiving the MDT activation message, the SN sends a request to the MN if the UE is to be selected and may select the UE after obtaining the consent of the MN, otherwise the UE may not be selected.

At 906, the UE receives one set of MDT configurations from base station 1 or base station 2, performs measurement according to the set of MDT configurations, and saves the measurement result corresponding to the set of MDT configurations.

Example 6

Figure 10:
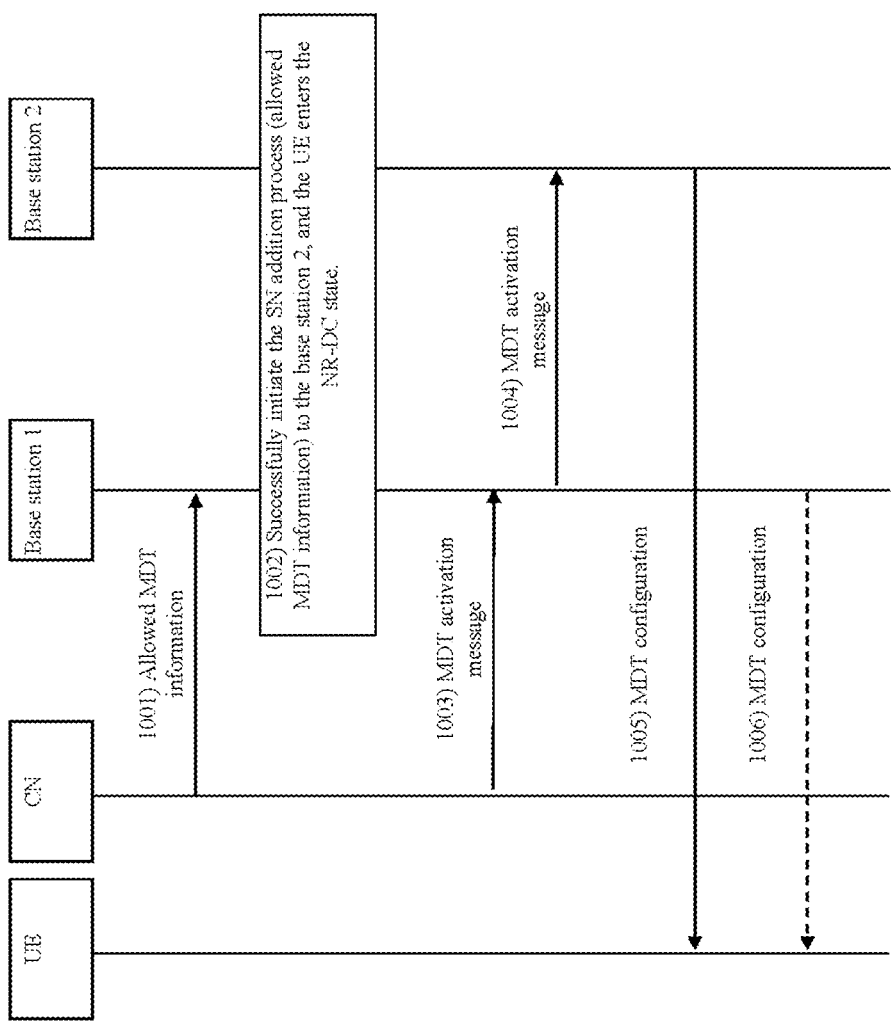

FIG. 10 depicts another process, in accordance with some example embodiments. At 1001, the core network sends the UE allowed MDT information to base station 1 via a message such as the INITIAL CONTEXT SETUP REQUEST, for the UE being accessed, or the core network passes for the UE that has completed the connection, via a message, such as the TRACE START message, or the MDT START message, carrying the UE allowed MDT information to base station 1. The UE allowed MDT information to include at least one of: allowing MDT at 4G RAT, allowing MDT at 5G RAT, allowing MDT at all RATs, allowing MDT at MN, allowing MDT at SN, allowing MDT at MN and SN, the total number of allowed MDT configurations, and the number of MDT configurations allowed with the same RAT.

At 1002, for the UE, base station 1 initiates the SN addition process with base station 2 and carries the UE allowed MDT information of the UE in the SN addition request message such as the S-NODE ADDITION REQUEST from base station 1 to base station 2, and the UE enters the NR-DC state. Base station 1 is a gNB and base station 2 is a gNB. The primary base station is base station 1 and the secondary base station is base station 2. Base station 2 obtains the UE allowed MDT information from the SN addition request message.

At 1003, base station 1 receives the MDT activation message from the CN, and base station 1 acquires the identification information of the UE that is indicated to perform the MDT from the MDT activation message.

At 1004, base station 1 sends an MDT activation message to base station 2 according to the UE allowed MDT information of the UE, such as "allowing MDT at SN", and carries the UE identification information, the measurement quantity information, and the address information of the corresponding entity (for example, TCE) the MDT measurement result to be reported to, etc.

At 1005, base station 2 sends the MDT configuration information to the UE.

At 1006, base station 1 may send MDT configuration information to the UE according to the UE allowed MDT information of the UE, such as "the number of MDT configurations allowed with the same RAT=2", or according to the UE allowed MDT information of the UE, such as "the number of MDT configurations allowed with the same RAT=1", does not send MDT configuration information to the UE.

Example 7

Figure 11:
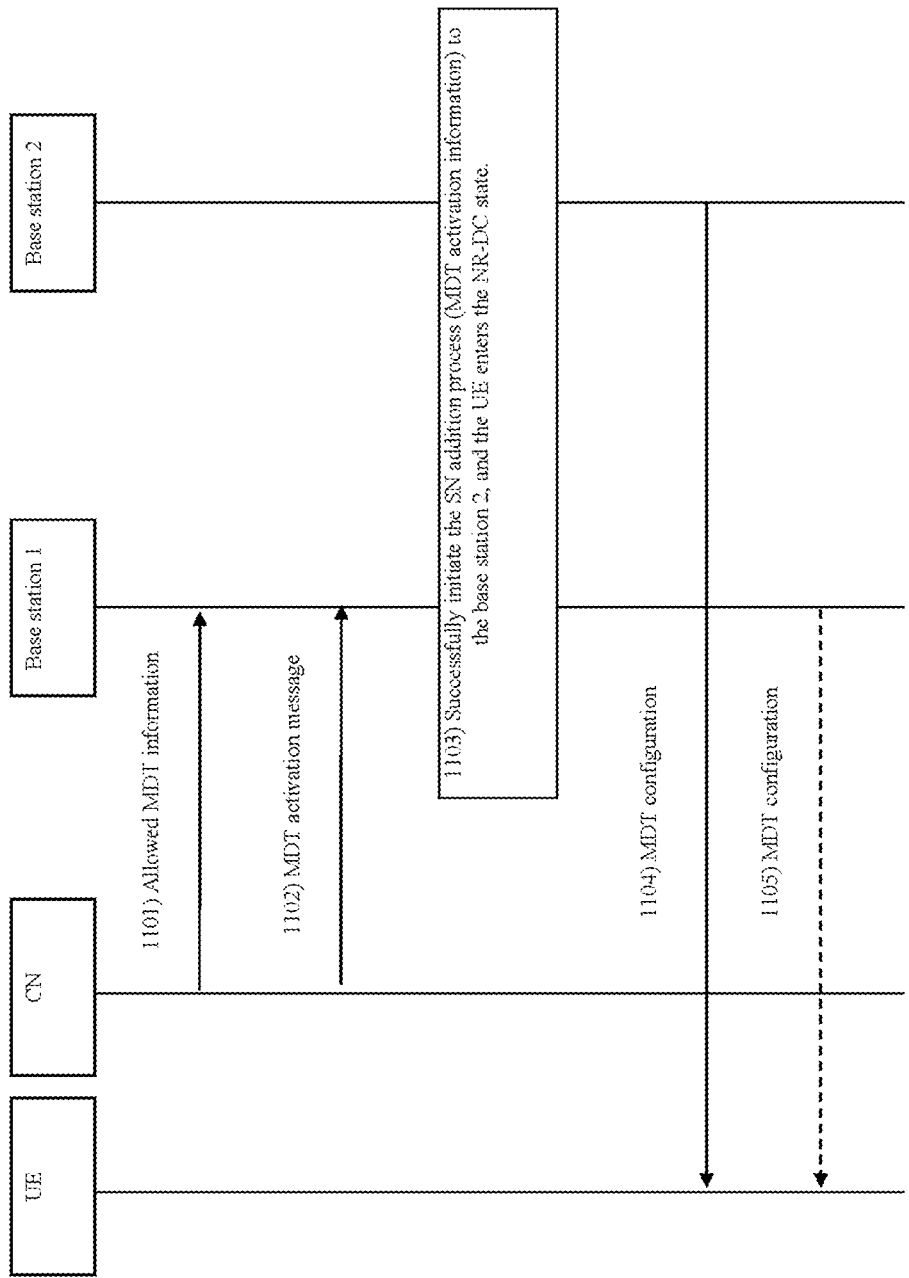

FIG. 11 depicts another process, in accordance with some example embodiments. At 1101, the core network sends the UE allowed MDT information to base station 1 via a message such as the INITIAL CONTEXT SETUP REQUEST, for the UE being accessed, or the core network passes for the UE that has completed the connection via a message, such as the TRACE START message, or the MDT START message, carrying the UE allowed MDT information to base station 1. The UE allowed MDT information to include at least one of: allowing MDT at 4G RAT, allowing MDT at 5G RAT, allowing MDT at all RATs, allowing MDT at MN, allowing MDT at SN, allowing MDT at MN and SN, the total number of allowed MDT configurations, and the number of MDT configurations allowed with the same RAT.

At 1102, base station 1 receives the MDT activation message of the CN, and the base station 1 acquires the identification information of the UE that is indicated to perform MDT from the MDT activation message.

At 1103, base station 1 initiates the SN addition process with base station 2 for the UE, and carries the UE allowed MDT information and/or MDT activation information of the UE in the SN addition request message such as the S-NODE ADDITION REQUEST from base station 1 to base station 2, the MDT activation information including: the measurement quantity information and the address information of the corresponding entity (for example, TCE) the MDT measurement result to be reported to, the UE enters the NR-DC state, the primary base station of the UE is base station 1, and the secondary base station is base station 2, and base station 2 obtains the UE allowed MDT information from the SN addition request message. Base station 1 is a gNB and base station 2 is a gNB.

At 1104, base station 2 sends the MDT configuration information to the UE.

At 1105, base station 1 may send MDT configuration information to the UE according to the UE allowed MDT information of the UE, such as the number of MDT configurations allowed with the same RAT equals 2, or according to the UE allowed MDT information of the UE, such as the number of MDT configurations allowed with the same RAT equals 1, does not send MDT configuration information to the UE.

Example 8

Figure 12:
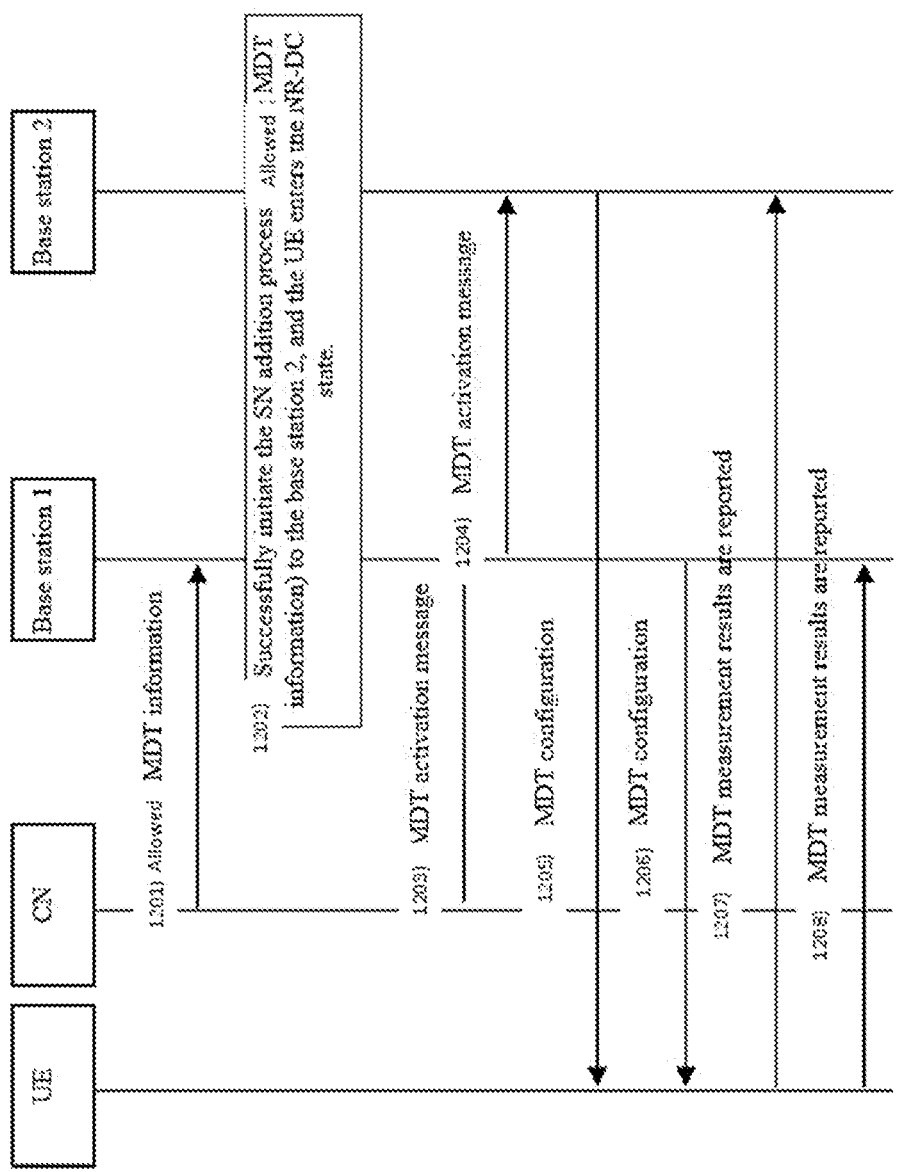

FIG. 12 depicts another process, in accordance with some example embodiments. At 1201, the core network sends the UE allowed MDT information to base station 1 via a message such as the INITIAL CONTEXT SETUP REQUEST, for the UE being accessed, or the core network passes for the UE that has completed the connection via a message, such as the TRACE START message, or the MDT START message, carrying the UE allowed MDT information to the base station 1. The UE allowed MDT information to include at least one of: allowing MDT at 4G RAT, allowing MDT at 5G RAT, allowing MDT at all RATs, allowing MDT at MN, allowing MDT at SN, allowing MDT at MN and SN, the total number of allowed MDT configurations, and the number of MDT configurations allowed with the same RAT.

At 1202, base station 1 initiates the SN addition process with base station 2 for the UE and carries the UE allowed MDT information of the UE in the SN addition request message such as the S-NODE ADDITION REQUEST from base station 1 to base station 2, and the UE enters the NR-DC state. The primary base station is base station 1 and the secondary base station is base station 2. Base station 1 is a gNB and base station 2 is a gNB. Base station 2 obtains the UE allowed MDT information from the SN addition request message.

At 1203, base station 1 receives the MDT activation message from the CN, and base station 1 acquires UE identification information and beam configuration information for the MDT from the MDT activation message. The beam configuration information includes at least one of the following: a number of reported beams, a number of reported beams by the MN, and a number of reported beams by the SN.

At 1204, base station 1 sends an MDT activation message to base station 2 according to the UE allowed MDT information of the UE, such as "allowing MDT at SN", and carries the UE identification information, the measurement quantity information, and the address information of the corresponding entity (for example, TCE) the MDT measurement result to be reported to, the beam configuration information, and the like.

At 1205, base station 2 sends MDT configuration information, including measurement quantity information, beam configuration information, and the like, to the UE.

At 1206, base station 1 sends the MDT configuration information, including the measurement quantity information, the beam configuration information, and the like, to the UE according to the UE allowed MDT information of the UE, such as "the number of MDT configurations allowed with the same RAT=2".

At 1207, the UE reports the MDT measurement result to base station 2, and reports the identifier of N best beams and the measurement results of the N best beams for each related cell, where N is the number of reported beams in the beam configuration information or the number of reported beams by the SN.

At 1208, the UE reports the MDT measurement result to base station 1, and reports the identifier of the N best beams and the measurement result of the N best beams for each relevant cell, where N is the number of reported beams in the beam configuration information or the number of reported beams by the MN.

Figure 13:
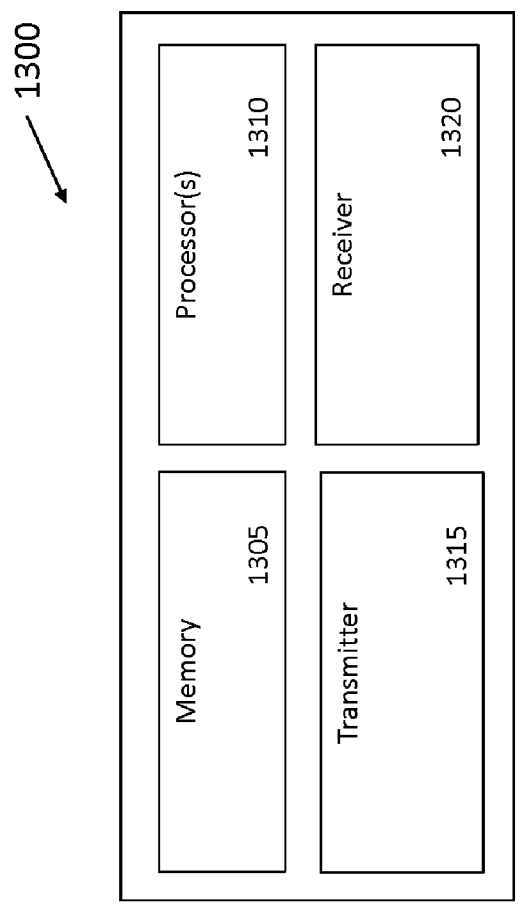
FIG. 13 depicts an example of an apparatus, in accordance with some example embodiments.

FIG. 13 depicts a block diagram 1300 representing of a portion of a radio station. A radio station 1300 such as a base station or a wireless device (or UE) can include one or more processors 1310 such as a microprocessor that implements one or more of the wireless techniques presented in this document. The radio station 1300 can include transmitter electronics 1315 to send and receiver electronics 1320 to receive wireless signals over one or more communication interfaces such as an antenna. The radio station 1300 can include other communication interfaces for transmitting and receiving data. Radio station 1300 can include one or more memories 1305 configured to store information such as data and/or instructions. In some implementations, the processor electronics 1310 can include at least a portion of the transceiver electronics 1320/1315. In some embodiments, at least some of the disclosed techniques, modules or functions are implemented using the radio station 1300.

The following examples are not intended to be limiting. Although specific communications equipment is listed, other equipment may be used in their place. In some example embodiments, a radio terminal is a base station such as an enhanced node B (eNB) or a next generation node B (gNB) or another base station. In some example embodiments, the radio terminal may be a user equipment, mobile terminal, handset, smartphone, cell phone, or other mobile device.

The following clauses recite features of various implementations.

Clause 1. A wireless communications method, comprising: receiving, at the first base station, an activation message to allow the first base station to receive the network performance information from a user equipment; selecting the user equipment from a plurality of user equipment based on allowed network performance information; sending, from the first base station to the user equipment, a configuration message including a configuration for the network performance information that includes the allowed network performance information.

Clause 2. The wireless communications method of claim 1, further comprising: receiving, at a first base station from a core network, a command to allow the reception of the network performance information.

Clause 3. The wireless communications method of claim 2, further comprising: forwarding, from the first base station to the second base station, the activation message to allow the second base station to receive the network performance information.

Clause 4. The wireless communications method of claim 3, further comprising: receiving, at the first base station, the network performance information from the user equipment.

Clause 5. The wireless communications method of claim 1, wherein the first base station is a primary node of a 5G system and the second base station is a secondary node of a 5G system.

Clause 6. The wireless communications method of claim 1, wherein command to allow the reception of network performance information includes a list of allowed information.

Clause 7. The wireless communications method of claim 1, wherein the network performance information is minimization of drive tests information.

Clause 8. A wireless communications method, comprising: receiving, at a second base station, a request to associate a first base station with the second base station; receiving, from the first base station, an activation message to allow the second base station to receive network performance information; sending, from the second base station to a user equipment, a configuration message including a configuration for the network performance information.

Clause 9. The wireless communications method of claim 8, further comprising: receiving, at the second base station, the network performance information from the user equipment.

Clause 10. The wireless communications method of claim 8, wherein the first base station is a primary node of a 5G system and the second base station is a secondary node of a 5G system.

Clause 11. The wireless communications method of claim 8, wherein command to allow the reception of network performance information includes a list of allowed information.

Clause 12. The wireless communications method of claim 8, wherein the network performance information is minimization of drive tests information.

Clause 13. An apparatus comprising a processor configured to implement a method recited in one or more of claims 1 to 11.

Clause 14. A computer program product having code stored thereon, the code, when executed by a processor, causing the processor to implement a method recited in one or more of claims 1 to 11.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communications method, comprising:
    receiving, at a first base station, a first message, the first message including at least one of user equipment (UE) allowed minimization of drive tests (MDT) information, UE MDT public land mobile network (PLMN) list information, beam configuration information, frequency configuration information, and A2 threshold information;
    selecting, by the first base station, a UE from a plurality of UEs based on the first message;
    sending, from the first base station to the UE, a second message including a configuration to configure the UE for collecting allowed MDT network performance information based on the first message; and
    receiving the allowed MDT network performance information from the UE.

2. The wireless communications method of claim 1, further comprising:
    receiving, at the first base station from a core network or OAM, the first message.

3. The wireless communications method of claim 1, further comprising:
    receiving, at the first base station from a second base station, the first message.

4. The wireless communications method of claim 1, wherein the network performance information is MDT information.

5. The wireless communications method of claim 1, wherein the UE MDT PLMN list information includes at least one of a management-based 4G radio access technology (RAT) MDT PLMN list, a signaling-based 4G RAT MDT PLMN list, a management-based 5G RAT MDT PLMN list, or a signaling-based 5G RAT MDT PLMN list.

6. The wireless communications method of claim 1, wherein the beam configuration information includes at least one of a number of reported beams or a report threshold.

7. The wireless communications method of claim 1, wherein the frequency configuration information includes information for the UE to log measurement results for frequencies of a MDT frequency list.

8. The wireless communications method of claim 1, wherein the A2 threshold information includes at least one of an A2 threshold for signal and interference to noise ratio (SINR), an A2 threshold for synchronization signal block (SSB), or an A2 threshold for CSI-RS.

9. A user equipment (UE), comprising:
    a transceiver; and
    one or more processors configured to:
        receive, via the transceiver from a first base station, a second message including a configuration to configure the UE for collecting network performance information, the first base station selecting the UE from a plurality of UEs based on information received by the first base station in a first message, the first message including at least one of user equipment (UE) allowed minimization of drive tests (MDT) information, UE MDT public land mobile network (PLMN) list information, beam configuration information, frequency configuration information, and A2 threshold information;
        collect allowed MDT network performance information according to the second message sent by the first base station, based on the first message; and
        transmitting, via the transceiver, to the first base station, the allowed MDT network performance information.

10. The UE of claim 9, wherein the UE MDT PLMN list information includes at least one of a management-based 4G radio access technology (RAT) MDT PLMN list, a signaling-based 4G RAT MDT PLMN list, a management-based 5G RAT MDT PLMN list, or a signaling-based 5G RAT MDT PLMN list.

11. The UE of claim 9, wherein the beam configuration information includes at least one of a number of reported beams or a report threshold.

12. The UE of claim 9, wherein the frequency configuration information includes information for the UE to log measurement results for frequencies of a MDT frequency list.

13. The UE of claim 9, wherein the A2 threshold information includes at least one of an A2 threshold for signal and interference to noise ratio (SINR), an A2 threshold for synchronization signal block (SSB), or an A2 threshold for CSI-RS.

* * * * *

UNITED STATES PATENT AND TRADEMARK OFFICE
CERTIFICATE OF CORRECTION

PATENT NO.         : 12,052,064 B2
APPLICATION NO.    : 17/376756
DATED              : July 30, 2024
INVENTOR(S)        : Jianmin Fang, Li Yang and He Huang Page 1 of 1

It is certified that error appears in the above-identified patent and that said Letters Patent is hereby corrected as shown below:

In the Claims

In Claim 9, Column 18, Line 25: please remove "the first base station selecting the UE" and insert -- wherein the UE is selected by the first base station --

Signed and Sealed this
Twenty-ninth Day of April, 2025

Coke Morgan Stewart
*Acting Director of the United States Patent and Trademark Office*